US009418501B2

(12) United States Patent
Loomis et al.

(10) Patent No.: US 9,418,501 B2
(45) Date of Patent: Aug. 16, 2016

(54) METHOD FOR DIGITAL SIGNATURE AUTHENTICATION OF PIN-LESS DEBIT CARD ACCOUNT TRANSACTIONS

(75) Inventors: Nancy Loomis, San Diego, CA (US); Julie Saville, Cardiff by the Sea, CA (US)

(73) Assignee: FIRST DATA CORPORATION, Greenwood Village, CO (US)

( * ) Notice: Subject to any disclaimer, the term of this patent is extended or adjusted under 35 U.S.C. 154(b) by 1896 days.

(21) Appl. No.: 11/854,879

(22) Filed: Sep. 13, 2007

(65) Prior Publication Data
US 2008/0222049 A1    Sep. 11, 2008

Related U.S. Application Data

(63) Continuation-in-part of application No. 11/671,219, filed on Feb. 5, 2007, now abandoned.

(51) Int. Cl.
G06F 21/00 (2013.01)
G07F 7/10 (2006.01)
G06Q 20/10 (2012.01)
G06Q 20/34 (2012.01)
G06Q 20/38 (2012.01)
G06Q 20/40 (2012.01)
G07F 7/08 (2006.01)
G07F 7/12 (2006.01)

(52) U.S. Cl.
CPC ............. *G07F 7/1008* (2013.01); *G06Q 20/10* (2013.01); *G06Q 20/341* (2013.01); *G06Q 20/355* (2013.01); *G06Q 20/3825* (2013.01); *G06Q 20/40* (2013.01); *G06Q 20/401* (2013.01); *G06Q 20/4014* (2013.01); *G06Q 20/40145* (2013.01); *G07F 7/08* (2013.01); *G07F 7/1025* (2013.01); *G07F 7/122* (2013.01)

(58) Field of Classification Search
CPC ...................................................... G06Q 20/382
USPC .......................................................... 705/50
See application file for complete search history.

(56) References Cited

U.S. PATENT DOCUMENTS

| | | | |
|---|---|---|---|
| 5,465,206 A | 11/1995 | Hilt et al. | |
| 5,728,999 A * | 3/1998 | Teicher | G06Q 20/04 235/380 |
| 5,870,723 A | 2/1999 | Pare et al. | |
| 5,893,907 A * | 4/1999 | Ukuda | G06Q 20/3555 705/35 |
| 5,937,396 A | 8/1999 | Konya | |
| 6,098,053 A * | 8/2000 | Slater | 705/44 |
| 6,227,447 B1 * | 5/2001 | Campisano | G06Q 20/04 235/380 |

(Continued)

OTHER PUBLICATIONS

Bray, Hiawatha, "US Mandates More Security in Online Banking," Nov. 7, 2005, The Boston Globe, 2 pages.*

(Continued)

*Primary Examiner* — Alexis Casey
(74) *Attorney, Agent, or Firm* — Kilpatrick Townsend & Stockton LLP

(57) ABSTRACT

A systems and methods for authenticating a consumer with a transaction card using digital signatures according to one embodiment of the invention is disclosed. These systems and methods allow consumers to digitally sign transaction information with a private key. The private key may be used to digitally sign the transaction, for example, through a hosted or local system that protects the integrity of the private key. A financial institution may authenticate the consumer by decrypting the digital signature with a public key.

15 Claims, 6 Drawing Sheets

(56) References Cited

U.S. PATENT DOCUMENTS

| | | | |
|---|---|---|---|
| 6,327,578 B1* | 12/2001 | Linehan | 705/65 |
| 6,542,583 B1 | 4/2003 | Taylor | |
| 6,609,113 B1* | 8/2003 | O'Leary et al. | 705/39 |
| 6,820,199 B2 | 11/2004 | Wheeler et al. | |
| 6,820,202 B1 | 11/2004 | Wheeler et al. | |
| 6,851,054 B2 | 2/2005 | Wheeler et al. | |
| 6,879,965 B2 | 4/2005 | Fung et al. | |
| 6,981,154 B2 | 12/2005 | Wheeler et al. | |
| 6,999,943 B1 | 2/2006 | Johnson et al. | |
| 7,032,112 B2* | 4/2006 | Wheeler et al. | 713/182 |
| 7,047,416 B2 | 5/2006 | Wheeler et al. | |
| 7,089,421 B2 | 8/2006 | Wheeler et al. | |
| 7,127,606 B2 | 10/2006 | Wheeler et al. | |
| 7,165,052 B2 | 1/2007 | Dively et al. | |
| 7,257,228 B2 | 8/2007 | Wheeler et al. | |
| 7,330,836 B2* | 2/2008 | Kausik | 705/50 |
| 7,333,635 B2* | 2/2008 | Tsantes et al. | 382/115 |
| 7,395,241 B1* | 7/2008 | Cook et al. | 705/39 |
| 7,398,252 B2 | 7/2008 | Neofytides et al. | |
| 7,581,257 B1* | 8/2009 | O'Hara | 705/75 |
| 7,606,760 B2* | 10/2009 | Hutchison et al. | 705/39 |
| 7,693,783 B2* | 4/2010 | Balasubramanian et al. | 705/38 |
| 7,702,916 B2* | 4/2010 | Seaton et al. | 713/185 |
| 7,707,120 B2* | 4/2010 | Dominguez et al. | 705/78 |
| 7,778,934 B2* | 8/2010 | Graves et al. | 705/67 |
| 2002/0032860 A1 | 3/2002 | Wheeler et al. | |
| 2002/0129248 A1 | 9/2002 | Wheeler et al. | |
| 2003/0097331 A1 | 5/2003 | Cohen | |
| 2003/0115151 A1 | 6/2003 | Wheeler et al. | |
| 2003/0154406 A1 | 8/2003 | Honarvar et al. | |
| 2003/0200184 A1* | 10/2003 | Dominguez et al. | 705/78 |
| 2003/0233317 A1 | 12/2003 | Judd | |
| 2004/0088587 A1 | 5/2004 | Ramaswamy et al. | |
| 2004/0117302 A1* | 6/2004 | Weichert et al. | 705/40 |
| 2004/0211830 A1* | 10/2004 | Algiene | G06Q 20/10 235/379 |
| 2004/0225606 A1 | 11/2004 | Nguyen et al. | |
| 2004/0230527 A1 | 11/2004 | Hansen et al. | |
| 2004/0230536 A1 | 11/2004 | Fung et al. | |
| 2005/0005123 A1 | 1/2005 | Wheeler et al. | |
| 2005/0005124 A1 | 1/2005 | Wheeler et al. | |
| 2005/0036611 A1* | 2/2005 | Seaton et al. | 380/44 |
| 2005/0097046 A1 | 5/2005 | Singfield | |
| 2005/0097049 A1 | 5/2005 | Writer et al. | |
| 2005/0182724 A1 | 8/2005 | Willard | |
| 2005/0192892 A1 | 9/2005 | Willard | |
| 2005/0246290 A1* | 11/2005 | Kausik | 705/67 |
| 2006/0006224 A1 | 1/2006 | Modi | |
| 2006/0179007 A1* | 8/2006 | Davis | 705/67 |
| 2006/0202025 A1* | 9/2006 | Calabrese | G06Q 20/40 235/380 |
| 2006/0213979 A1 | 9/2006 | Geller et al. | |
| 2006/0213980 A1* | 9/2006 | Geller et al. | 235/380 |
| 2006/0235796 A1 | 10/2006 | Johnson et al. | |
| 2007/0011099 A1 | 1/2007 | Sheehan | |
| 2007/0028109 A1 | 2/2007 | Wysocki et al. | |
| 2007/0088950 A1 | 4/2007 | Wheeler et al. | |
| 2007/0177768 A1* | 8/2007 | Tsantes et al. | 382/115 |
| 2007/0179885 A1 | 8/2007 | Bird et al. | |
| 2008/0040276 A1 | 2/2008 | Hammad et al. | |

OTHER PUBLICATIONS

PCT International Search Report mailed Nov. 28, 2008, International Application No. PCT/US08/76232, 10 pages.

Federal Reserve approved bank processing network managing POS and ATM transaction across the United States: by ATMscrip.com—ATM Processing Networks Debit Processing Networks, Regional Debit Networks, NYC, p. 1 at web.archive.org/web/*/http://www.atmscrip.com/processing_networks.html.

Bray, Hiawatha, "US Mandates More Security in Online Banking," The Boston Globe, 2 pages, Nov. 7, 2005.

Richardson, Vanessa, "Online Banking Moving Beyond the Password," MSNBC.com, 2 pages, Dec. 29, 2005.

* cited by examiner

METHOD FOR DIGITAL SIGNATURE AUTHENTICATION OF PIN-LESS DEBIT CARD ACCOUNT TRANSACTIONS

CROSS-REFERENCE TO RELATED APPLICATION

This application is a continuation-in-part and claims the benefit of co-pending, commonly assigned U.S. patent application Ser. No. 11/671,219, filed Feb. 5, 2007, entitled "Authentication of PIN-Less Transactions," the entire disclosure of which is incorporated herein by reference for all purposes.

BACKGROUND OF THE INVENTION

This disclosure relates in general to secure Internet transactions using an open loop debit card network and, but not by way of limitation, to enrollment and authentication of Automatic Teller Machine (ATM) cardholders or debit card cardholders for Internet transactions amongst other things. In this context, electronic funds transfer (EFT) networks refer to financial networks that primarily process ATM and point-of-sale transactions that require PIN entry for authentication, as opposed to networks that primarily require signatures for cardholder authentication. EFT networks are additionally known for their single message, guaranteed-funds transaction processing architecture.

The development of the Internet and Internet shopping in particular has led to increased developments in Internet security and secure transactions in eCommerce. Most Internet transactions are completed using credit cards, signature debit cards or other payment schemes such as PayPal or Google Checkout. Due to the high cost of introducing PIN-protecting hardware or software, ATM/Debit card payments that require PIN entry have been limited on the Internet. Security experts have advised against allowing PIN entry on PCs due to the risk of fraudsters capturing this information. Fraudsters may then use the transaction card and PIN information to create fraudulent plastic cards to obtain cash at an ATM, thus draining the victims' checking or savings accounts. Moreover, for at least these reasons, ANSI standards do not permit PIN entry for Internet transactions. EFT networks do allow ATM/Debit cardholders to make card payments—without entering the associated PIN—to companies that cardholders already have relationships with and who perform the authentication—such as utilities, which mitigates the risk of fraud. Debit card network transactions are typically authenticated, often using a PIN, which is validated at a financial institution.

Due to the spread of eCommerce and the desire to incorporate more security and transaction efficiencies, there is a general need for a technical solution to handle ATM/Debit card transactions over an EFT network with greater transaction security.

BRIEF SUMMARY OF THE INVENTION

A method for authenticating an electronic transaction between a consumer and a merchant according to one embodiment of the invention is disclosed. A merchant may receive account information associated with an account from the consumer over the Internet. The account information may be sent in response to a request to purchase an item from a webpage and may include account numbers, account holder name, expiration date of transaction card, etc. The merchant may then confirm enrollment of the account for digital signature authentication from a financial institution through the network. The financial institution may include a cardholder account directory service (CADS), an issuer authentication server (IAS) or a financial institution. The financial institution may send enrollment confirmation to the merchant.

If the consumer and/or account are enrolled, the merchant receives consumer specific authentication parameters from the financial institution and/or the network that may include an authentication scheme. The financial institution may send information regarding whether the consumer will be authenticated using a local or hosted scheme. The authentication scheme may include a URL with a transaction identifying token The URL points to the appropriate webpage or plug-in that may digitally sign the transaction using the consumer's private key. The URL may point to a plug-in residing on the consumer's computer system or may point to a webpage hosted by the IAS or anther financial institution. The merchant may forward the transaction information and/or the authentication scheme to the consumer's computer. The consumer may then digitally sign the transaction by encrypting the transaction data with the private key using the local plug-in or at the webpage hosted by the IAS. If the consumer is using a local authentication scheme, the consumer may then send the digital signature back to the merchant and/or IAS. If the consumer is using a hosted authentication scheme the digital signature may be sent directly to the merchant. The merchant, regardless of the scheme, may send the digital signature to a financial institution through the network for decryption and/or authentication. In another embodiment, the network may authenticate and/or decrypt the digital signature. For example, the digital signature may be sent to the financial institution through the STAR® Network or other related network.

The digital signature may be encrypted using one of the following: RSA encryption, the digital signature algorithm, Schnorr signature, Pointcheval-Stern signature algorithm, the Rabin signature algorithm, any of the SHA algorithms, the undeniable signature algorithm, ECDSA, DSA, the ECC algorithm, elliptical curve techniques, Paillier cryptosystem, the ElGamal algorithm, the Diffie-Hellman key exchange, a combination thereof, or any similar algorithm. In order for the consumer to have the transaction digitally signed using the private key the consumer may be required to enter a personal identification number, a password, an answer to a question, a biometric sample, and/or a PC scan.

The merchant may send transaction information to a plug-in at the consumer's computer for authentication. The transaction that needs a digital signature may be based on the authentication scheme. The merchant may send the following information to the plug-in at the consumer's computer: transaction currency code, transaction amount, transaction ID, transaction reference number, transaction time, transaction ship data, account number, consumer name, and/or merchant name.

Once received, the digital signature may be sent to the merchant processor along with other transaction information. The merchant may create an ISO 8583 message with the digital signature. In other embodiments the merchant processor may create the ISO 8583 message. The merchant processor may then sends the ISO 8583 message to the network and/or through the network to the financial institution.

A method for authenticating an electronic transaction between a consumer and a merchant is disclosed according to one embodiment of the invention. The consumer enrolls the transaction card for digital signature authentication at a financial institution. The enrollment may occur at issuance, in person at the financial institution or over the Internet. The enrollment may require identifying information and provides the consumer access to digitally sign transactions. The consumer initiates a transaction over the Internet between themselves and a merchant and the consumer selects to pay for the transaction with a transaction card. After receipt of the transaction information the merchant sends the consumer transaction information and an authentication scheme.

The consumer may then proceed to digitally sign the transaction information according to the authentication scheme. The authentication scheme may include a URL pointing to either a plug-in on the consumers computer or a webpage hosted by a financial institution. The URL may also include a token that uniquely identifies the transaction. The consumer gain have the transaction digitally signed using private key by providing the required security information as required by the authentication scheme. The consumer may then create a digital signature by encrypting the transaction information with the private key. Whereupon the consumer may send the digital signature to the merchant.

The URL may point to a plug-in maintained on the consumer's computer. The plug-in may direct the computer to open stand alone software that contains the private key and may digitally sign the transaction information. The plug-in may also direct the computer to communicate with a hardware device that includes the private key, such as a smart card. The stand alone software may require the consumer to respond to security questions and/or challenges prior to providing access to the private key. For example, the software may require the consumer to enter a PIN, pass code, username, and/or password. Moreover, the software may be operable to communicate with a biometric device and/or a smartcard reader. The biometric device and/or smartcard reader may be used to identify the consumer to gain access to the private key.

A system for authenticating an electronic transaction between a consumer and a merchant is discloses according to one embodiment of the invention. At a minimum, the system may include a merchant system, a merchant processor, a IAS, a CADS, and a financial network. The merchant processor, the IAS and the CADS may be in communication with each other over the financial network. The merchant system is connected with the Internet and presents a webpage that is accessible by consumers. The webpage may offer goods or services for sale and may permit the user of a transaction card, such as an ATM card and a debit card. The merchant processor may also be called a gateway. The merchant processor processes is coupled with the merchant and processors transactions for the merchant. The IAS hosts a web service that may be accessible by the consumer for authentication purposes. The CADS maintains enrollment information.

BRIEF DESCRIPTION OF THE DRAWINGS

The present disclosure is described in conjunction with the appended figures.

Figure 1:
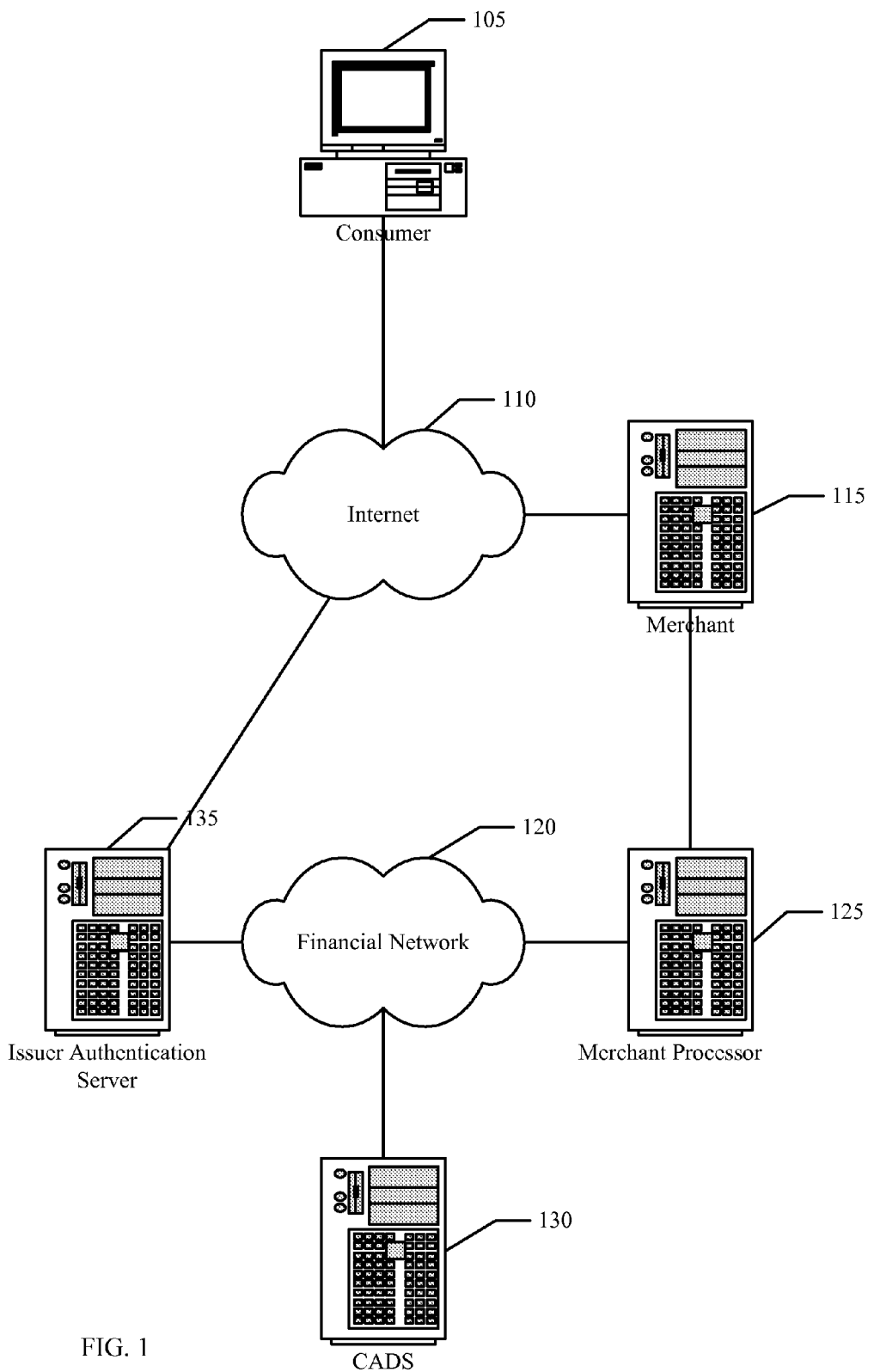
FIG. 1 shows a system for authenticating transaction card transactions over the Internet according to one embodiment of the invention.

In the appended figures, similar components and/or features may have the same reference label. Where the reference label is used in the specification, the description is applicable to any one of the similar components having the same reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

In one embodiment, the present disclosure provides a system that authenticates a consumer for use of a transaction card in Internet transactions. The system may provide a consumer and/or a web-based merchant a number of schemes for authenticating the consumer for transaction card purchases over the internet without requiring the consumer to provide a personal identification number (PIN) to the merchant. For example, a consumer may be authenticated for use of a transaction card with a private key that is accessed at the consumer's computer by a plug-in. As another example, a consumer may be authenticated to use a transaction card using a private key that may be accessed through a secure webpage hosted by an issuer authentication server (IAS). In yet another example, the private key may be accessed through a smart card or other external device that contains the private key.

In another embodiment of the invention, a method for authenticating a consumer using a transaction card using a digital signature is disclosed. The consumer may digitally sign transaction related information through a local or hosted system. The digital signature may be created by encrypting transaction data with a private key. Each consumer may be provided with a unique private key. The private key may be issued in conjunction with a security device that may be used with a computer. The private key may also be issued to a consumer when they open an account or when they enroll an existing card in an authentication scheme. The private key may be held on the consumer computer with access limited through security features. The private key may also be held at a issuer established web server with access limited through security measures. These security measures may include passwords, usernames, pass codes, biometrics, key stroke metrics, a smartcard reader, etc. The issuers and/or consumer may dictate the level of security required to gain access to the private key for digital signatures. The digital signature may be decrypted using a public key. A comparison of the encrypted transaction data and the transaction data may be used to confirm authenticity of the consumer for a transaction with the transaction card.

In another embodiment, the present disclosure provides for methods and procedures for a merchant to authenticate a consumer using a transaction card for Internet-based transactions. These methods may include confirming enrollment of a transaction card and/or consumer for Internet-based transactions. Receiving an authentication scheme from a financial institution server that includes a URL pointing to a webpage maintained by a financial institution or a URL pointing to an authentication program maintained on the consumer's computer. The authentication scheme may provide a private key that is accessible through various security measures. The private key may be used to digitally sign specific transaction information. A public key may be used by a financial institution in order to confirm the authentication from the consumer and authorize the transaction.

The term "transaction card" as used throughout this disclosure may include but is not limited to ATM cards, credit cards, charge cards, stored value accounts, stored value cards, gift cards, checking accounts, savings accounts, bank accounts, or the like whether or not the transaction card or account is PIN secured or not. A PIN can be a number, a series of numbers, letters, characters, or any combination thereof used as a security instrument to authenticate a cardholders.

As used throughout this disclosure, the term "consumer" may refer to activities that occur at a computer operated by the consumer as well as an individual consumer. The computer may be of any type and may carry out specific authentication activities through plug-in software, using a web browser or with an external device without requiring initiation by an individual operating the computer.

FIG. 1 shows a system for authenticating a consumer for transactions using a transaction card over the Internet according to one embodiment of the invention. The system includes a consumer 105 with access to the network 110. The consumer 105 may access the network 110 through a personal computer using any number of Internet service providers. The consumer 105 may access the network 110 from the consumer's computer, a public computer, a borrowed computer, a work related computer or any other computer system. The network 110 may be any combination of the following: the Internet, an IP network, an intranet, a wide-area network ("WAN"), a local-area network ("LAN"), a virtual private network, the Public Switched Telephone Network ("PSTN"), a financial network, a mobile phone network, or any other type of network supporting data communication between devices described herein, in different embodiments. The network 110 may include both wired and wireless connections, including optical links.

The consumer 105 may also include software that may be used to digitally sign a transaction using an encryption scheme and a private key. The software may include, for example, a wallet application that stores personal information and/or a private key or, for example, a driver for a smartcard reader or biometric reader.

The merchant 115 is connected to the network 110 through a network connection. The merchant 115 provides a webpage providing a variety of products for sale that may be purchased by consumers over the Internet. The merchant 115 may include a computer system comprising servers, web servers, personal computers, or the like. The merchant 115 may include any number of servers or hosted servers. The merchant 115 may also provide a secure interchange between for the consumer 105 to enter and exchange payment and transaction information. The merchant 115 is in communication, either directly or indirectly with a financial network 120. In this embodiment, the merchant 115 communicates with a merchant processor 125, which is then in communication with the financial network 120. In other embodiments, the merchant 125 may directly communicate with the financial network 120.

The financial network 120 may comprise a debit network, an ATM network, a credit card network, EFT network, or any other financial network. For example, the financial network 120 may comprise a network such as the NYCE® network, the Pulse® network, the STAR® network, or the like. Many other examples are possible and apparent to those skilled in the art in light of this disclosure. In the discussion that follows, a financial network 120 may or may not be noted specifically. If no specific means of connection is noted, it may be assumed that the link, communication or other connection between devices may be via a network 120. A merchant processor 125, issuer authentication server (IAS) 135, and a cardholder account directory services 130 (CADS) may also be in communication with the financial network 120. The financial network 120 may additionally include a financial network host server that includes one or more of the merchant processor 125, the IAS 135 or the CADS 130.

The merchant processor 125 may provide transaction authentication and processing capabilities to a merchant 115. Merchant's 115 may provide their own merchant processor 125 or use a third-party merchant processor 125. The merchant processor 125 may provide access for the merchant 115 to the financial network 120.

The CADS may include a directory of valid and registered debit cards and/or accounts that have been enrolled by the issuer for authentication with Internet-based transactions. The CADS may be accessed as part of a transaction or enrollment process. From an enrollment standpoint, the CADS may act as the repository for all information that is registered by the debit card issuer during their enrollment process. the CADS may hold the following information about the consumer: customer primary account number (PAN), the type of signing that is used by the cardholder (local or hosted), if local, then the URL of the plug-in launcher, and if hosted, then the URL of the IAS. The CADS may be included in a financial institution host computer system. The CADS may also be a standalone server, system or database.

The IAS may also be in communication with the financial network 120 and the Network 110. The IAS may provide a hosted Internet service that provides the digital signature capabilities to a consumer over the Internet. The IAS stores and maintains private keys for consumers and debit cards that may be used to digitally sign a transaction. The IAS may authenticate a consumer using any number of authentication schemes, such as, for example, requiring a password, pass code, PIN, or responding to an identifying question. Once a consumer is authenticated, the IAS may digitally sign a transaction by encrypting transaction details using a private key. The IAS may be maintained by an issuing financial institution, a third-party agent of the issuing financial institution, or by the financial network host computer system.

Each component of the system described above, the merchant 115, the merchant processor 125, the IAS 135, and the CADS 130 may include one or more server computers, workstations, web servers, or other suitable computing devices. These components may be fully located within a single facility or distributed geographically, in which case a financial network 120, the Network 110, or an intranet may be used to integrate components.

Figure 2:
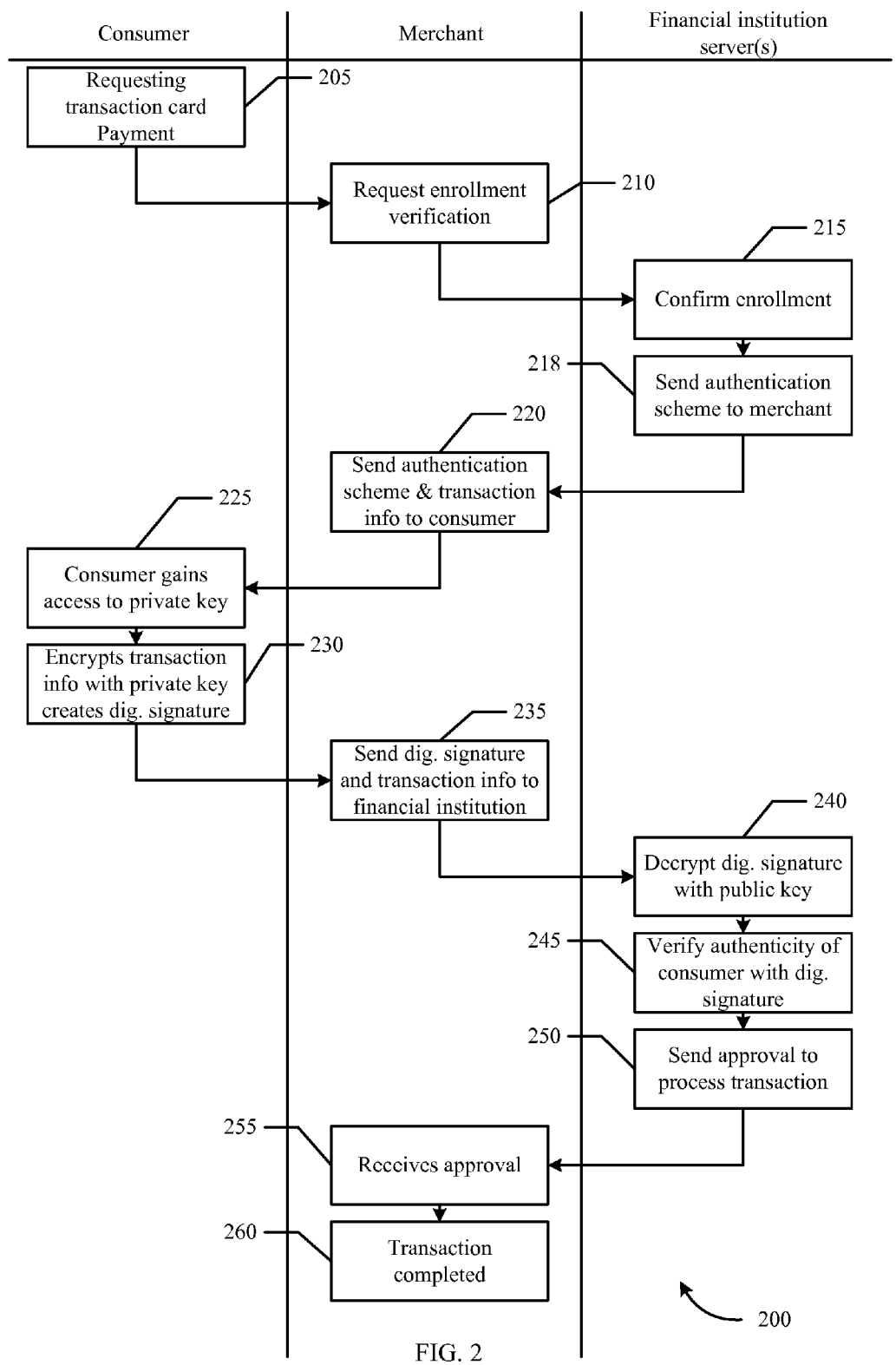
FIG. 2 shows an authentication flowchart between a consumer, a merchant, and a financial institution server according to one embodiment of the invention.

FIG. 2 shows an authentication flowchart between a consumer, a merchant, and a financial institution server according to one embodiment of the invention. The consumer initiates the process by accessing a merchant's webpage, selecting an item to purchase and requesting payment using a transaction card at block 205. The merchant may present a logo, or drop down box to the consumer that includes various payment schemes, including payment with a transaction card. The merchant receives the request for payment with a transaction card and queries a financial institution server regarding whether the transaction card is enrolled for Internet based authentication at block 210. The merchant may send this request through a merchant processor, which in turn may send messages to the financial institution through a financial network. Similarly, communication between the financial institution and the merchant may occur through a financial network and/or a merchant processor. The merchant may send, at least, the primary account number (PAN) of the transaction card to the financial institution server for enrollment verification. If the transaction card is not enrolled, the transaction fails; whereupon the consumer may also be directed to instructions for enrolling a transaction card and/or the consumer for future payments. After enrollment, the consumer may then be approved for such payments.

If the transaction card's enrollment or the consumer's enrollment is confirmed at block 215, the financial institution server sends an authentication scheme specific to the consumer to the merchant at block 218. The authentication scheme may include whether the consumer is enrolled in hosted authentication or plug-in based authentication. The authentication scheme may also dictate the type and quantity of transaction information that must by digitally signed. The merchant may forward the authentication scheme and transaction information to the consumer at block 220. The transaction information may include transaction currency code, transaction amount, transaction ID, transaction reference number, transaction time, transaction shipment data, account number, consumer name, and/or merchant name.

Once the user has received the transaction information and the authentication scheme from the merchant, the consumer may be authenticated with the private key based on the authentication scheme at block 225. The consumer may be authenticated with the private key over the Internet or through software on the consumer's computer that is launched through a plug-in. Creating a digital signature using the private key may require a password, pass code, PIN, a response to a security question, a biometric sample, a smartcard reader, or any combination of the above. Once the consumer has properly responded to the security, whether over the Internet or through their computer, a digital signature may be created by encrypting portions of the transaction information at block 230. The encryption may create a hash value that may be used as the digital signature. Moreover, a number of transaction fields may be encrypted into hashes. The consumer's computer may run a stand alone program that encrypts the transaction information or may accessed the provided webpage for encryption. Encryption may include any known encryption method that may be decrypted with a public key, for example, RSA encryption or derivatives thereof, the digital signature algorithm, Schnorr signature, Pointcheval-Stern signature algorithm, the Rabin signature algorithm, any of the SHA algorithms, the undeniable signature algorithm, ECDSA, DSA, the ECC algorithm, elliptical curve techniques, Paillier cryptosystem, the ElGamal algorithm, and/or the Diffie-Hellman key exchange.

The consumer may then sends the digital signature to the merchant. The merchant forwards the digital signature and the transaction information to the financial institution server at block 235. The merchant may first forward the digital signature to a merchant processor. The merchant may also format the digital signature into an ISO 8583 message prior to sending. The financial network may route the message to the appropriate financial institution or the IAS for verification.

The financial institution server may then decrypt the digital signature using a public key at block 240. This decryption, in other embodiments, may occur at the network. The consumer may then be verified by comparing the decrypted information with the transaction information sent by the merchant at block 245. If the digital signature is verified, then an approval message is sent to merchant at block 250. The approval message may include an appropriate ISO 8583 response. The approval may be received by the merchant at block 255 and the transaction may be completed at block 260.

Figure 3:
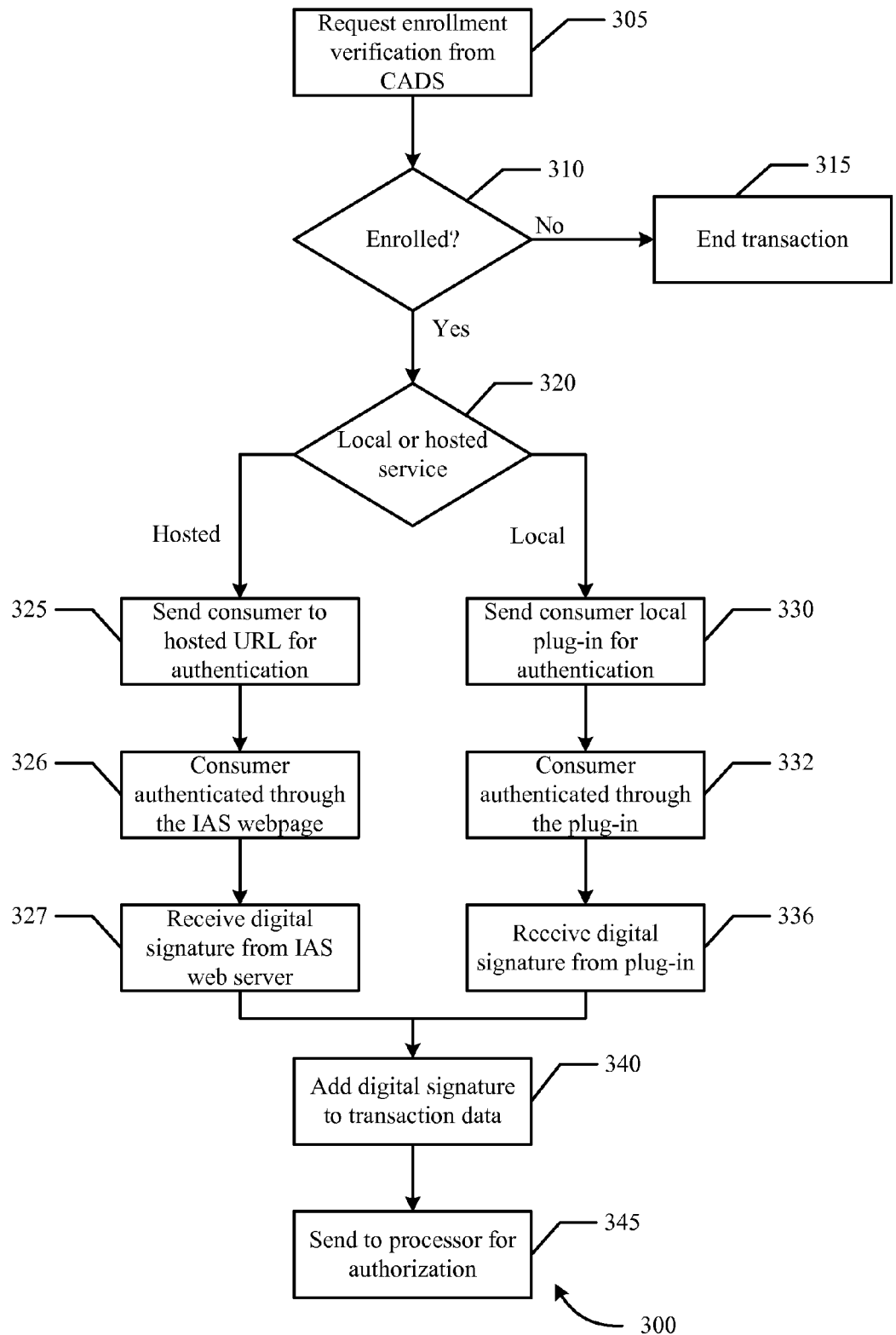
FIG. 3 shows another flowchart of a transaction card authentication scheme according to one embodiment of the invention.

FIG. 3 shows another flowchart of a authentication scheme for authenticating a consumer using a transaction card from the merchant perspective according to one embodiment of the invention. Once the merchant receives a request from a consumer for a transaction card payment, the merchant requests enrollment verification from the CADS at block 305. The CADS may inquire at the issuer financial institution or the IAS for enrollment information. The merchant may communicate with the CADS through a merchant processor and/or through a financial network, such as, for example, and ATM network. The merchant processor may reformat the request to conform with the proper the CADS specification. The request may send a message that includes the PAN of the consumer's transaction card to the CADS. If the CADS determines that the transaction card is not enrolled at block 310, then the transaction ends at block 315.

If the transaction card is enrolled, the CADS may lookup the financial institution's bank identification number (BIN) associated with the transaction card. The BIN may then be used to determine whether the transaction card is enrolled to use a local or hosted digital signature service at block 320. If the CADS determines that the transaction card is enrolled in a hosted authentication service, then the CADS sends a message to the IAS associated with the PAN in the CADS database.

Once the IAS has received the request from the CADS, the IAS may verify that the cardholder is enrolled and in good standing prior to continuing with the transaction. The IAS may store transaction information and create a transaction token. A URL that contains the transaction token may be created and returned to the CADS, which may then be forwarded to the merchant. The URL points to a webpage that may be used by the consumer to authenticate the transaction. The token is used to uniquely identify the transaction. The merchant may then forward the URL to the consumer at block 325.

The consumer may then direct their browser to the webpage pointed by the URL provided the IAS. The browser may also automatically direct the browser to the webpage pointed to by the URL. When the consumer does so, the IAS may use the unique token (included in the URL) to identify the transaction as well as identify the consumer. The IAS, through the webpage, may authenticate the consumer at block 326. For example, the IAS web may then display a challenge to the consumer, for example, the IAS may require a username, password, a PIN, etc., for the consumer to enter. If the consumer authenticates himself or herself correctly, the IAS will digitally sign the authentication request data with the private key that has been previously registered with consumer at enrollment. The consumer may then send the digital signature back to the merchant at block 327.

Returning back to block 320, if the CADS determines that the transaction card and/or the consumer is enrolled in a local authentication service, then the CADS may send a message to a plug-in launcher (PIL) associated with the PAN in the CADS database. The PIL may be part of the financial network host computer system, the CADS, issuer computer system or the IAS. The PIL may create a URL that contains the appropriate code to launch a local plug-in on the consumer's computer. The URL is returned to the CADS and then forwarded to the consumer at block 330. The consumer's web browser may then be directed to the URL (either manually or automatically), whereupon the plug-in may be launched. The plug-in may be used to authenticate the consumer at block 332. The plug-in, in one embodiment, may interface with a smartcard reader, biometric detector, or other security enabled database. The plug-in may require various inputs from the consumer in order to verify the consumer and provide the private key. If the consumer authenticates himself or herself correctly using the plug-in, the plug-in will digitally sign the authentication request data with the private key that is associated with the plug-in and registered with the consumer at enrollment. The consumer may the send the digital signature back to the merchant at block 336.

Regardless of the authentication scheme, the merchant may then receive the digital signature from the consumer at block 335. The digital signature may then be forwarded with the transaction data to the merchant processor for authorization and payment at blocks 340 and 345. The merchant processor may then transmit a message to the financial network, which may forward the message to the issuer or issuer processor. The message may be sent using the ISO 8583 format. The issuer may then approve or deny the transaction. The issuer may also send the appropriate message back to the merchant, for example, using the ISO 8583 format. The issuer may decrypt the digital signature in order to verify the authenticity of the consumer using the card.

Figure 4:
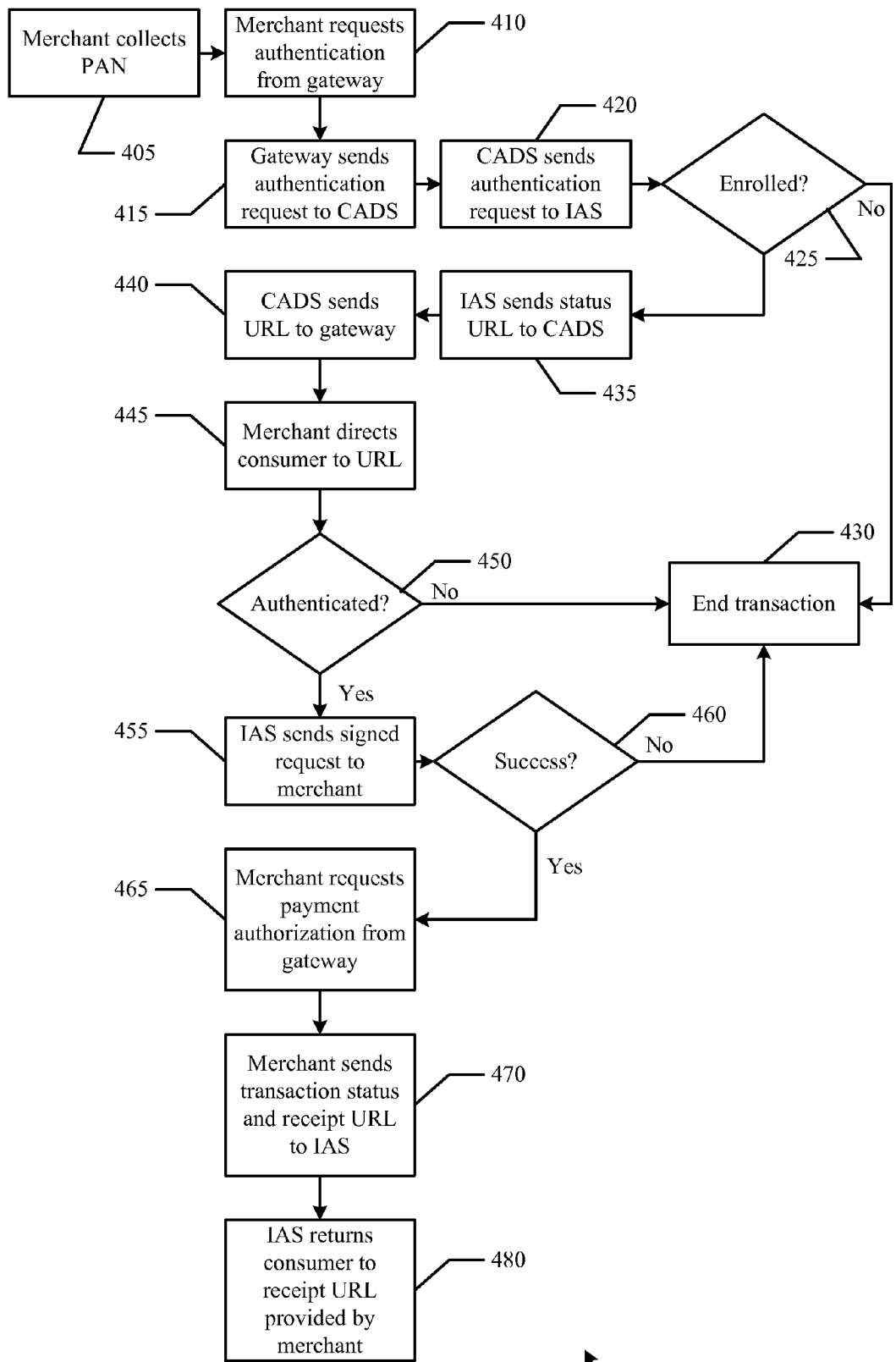
FIG. 4 shows another flowchart of a hosted transaction card authentication scheme according to one embodiment of the invention.

FIG. 4 shows another flowchart of a hosted authentication scheme according to another embodiment of the invention. A merchant receives a PAN from a consumer for payment over the Internet at block 405. The merchant requests authentication from the merchant processor (gateway) at block 410. The merchant processor then sends a request to the CADS that may then be forwarded to the IAS at blocks 415 and 420. The CADS and the IAS may determine whether the card associated with the PAN is enrolled for hosted authentication at block 425. If the card is not enrolled or not active, the transaction may end at block 430. Otherwise, the IAS may send an authentication URL to the CADS at block 435. The authentication URL may point to a webpage maintained by the IAS for authentication of consumer's for Internet based transactions. The URL may also include a unique transaction identifying token. The IAS may also send status information along with the URL. The CADS may send the URL to the merchant at block 440. Whereupon, the merchant may direct the consumer to the URL at block 445.

The consumer may then be presented with a webpage pointed to by the URL hosted by the IAS. The consumer may then respond to challenges presented by the IAS through a webpage pointed to by the URL. The webpage may present the consumer with requests for username, PAN, passcode, password, PIN, security questions, etc. in order to authenticate the consumer for use with the transaction card at block 450. If authentication fails then the transaction ends at block 430. If authentication is successful, the IAS sends the digitally signed transaction request to the merchant at block 455. If the digitally signed transaction request fails to properly arrive at the merchant, the transaction fails at blocks 460, 430. Otherwise, the merchant requests payment authorization from the merchant processor (gateway) at block 465. The merchant then sends transaction status information and a receipt URL to the IAS at block 470. The IAS then directs the consumer browser to the receipt URL provided by the merchant at block 480.

Figure 5:
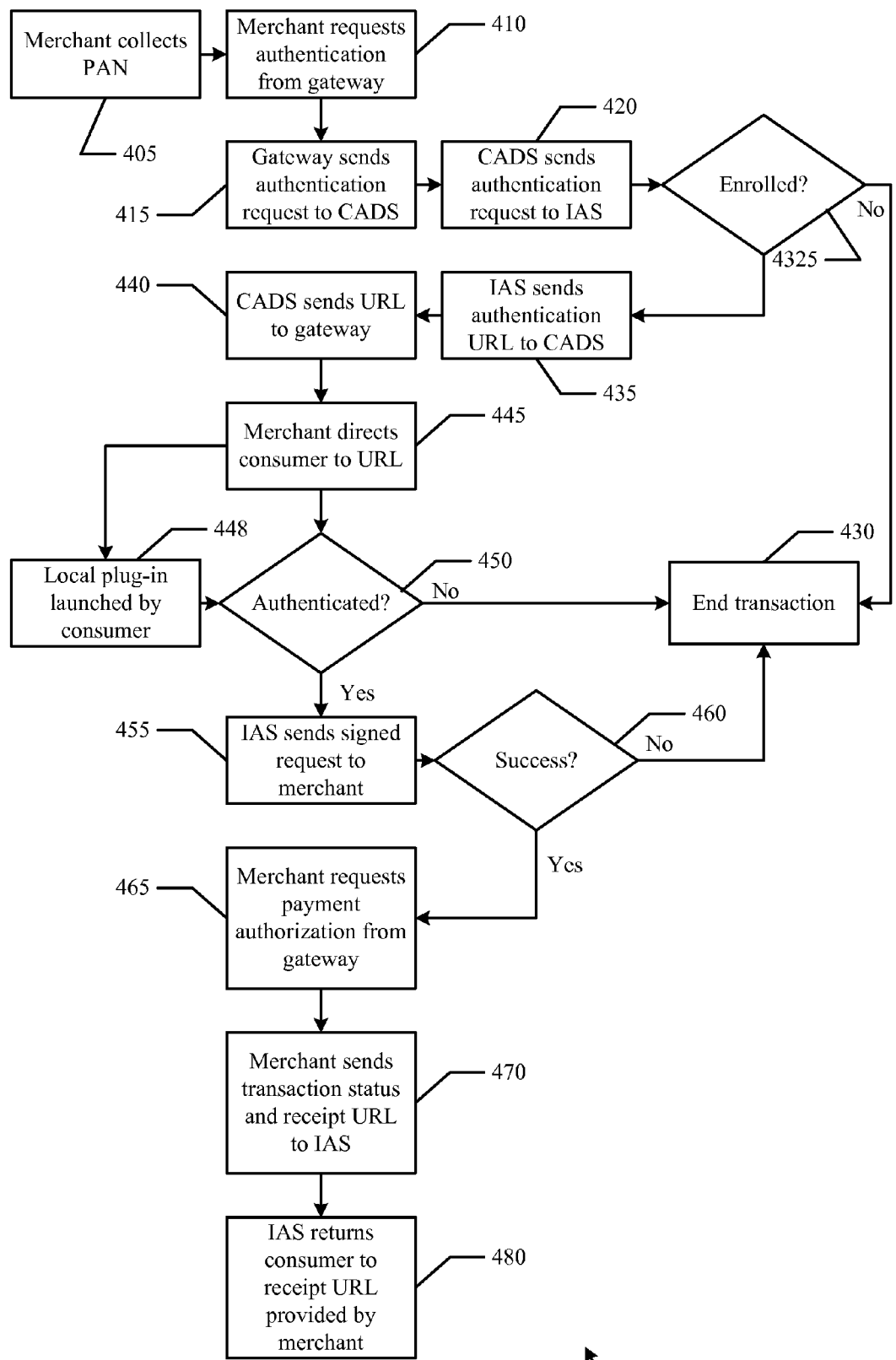
FIG. 5 shows another flowchart of a local transaction card authentication scheme according to one embodiment of the invention.

FIG. 5 shows another flowchart of a local authentication scheme according to another embodiment of the invention. In this embodiment of the invention, the consumer is authenticated using a local authentication scheme. For example, the consumer may employ a biometric reader, a protected database, a wallet, a smartcard reader, etc. that return a private key that may be used to create a digital signature. The flowchart shown in FIG. 5 is similar to the flow chart in FIG. 4. In FIG. 5 however, the IAS directs the consumer to a local software program using a plug-in. As shown in FIG. 5 the merchant directs the consumer to the URL pointing to the plug-in at block 445. The local plug-in then launches the appropriate software for the authentication scheme employed by the consumer at block 448. Moreover, in other embodiments, a separate PIL may be used rather than the IAS to create the appropriate URL that is sent to the consumer at block 435.

Figure 6:
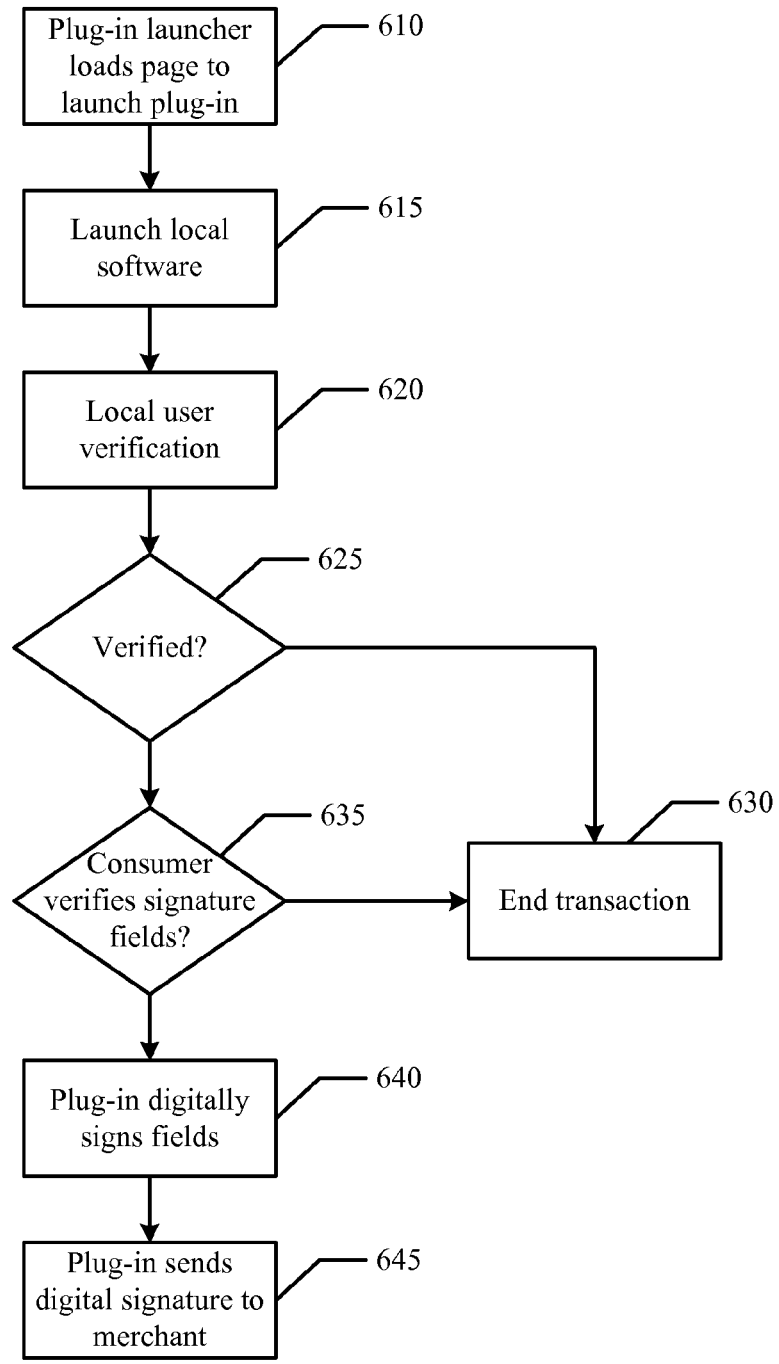
FIG. 6 shows yet another flowchart of a transaction card authentication scheme at the consumer using a local plug-in according to one embodiment of the invention.

FIG. 6 shows yet another flowchart of an authentication scheme at the consumer using a local plug-in according to another embodiment of the invention. Starting at block 448 in FIG. 5, the plug-in launcher is loaded at block 610. The plug-in launcher directs the consumer's computer to launch local software on the computer at block 615. The local software controls a private key that may be used to encrypt transaction information or a transaction request into a digital signature for authentication. The local software presents the consumer with identifying information, such as a password, a passcode, a PIN, a biometric sample, a card read from a smartcard reader, keystroke metric, identifying questions, etc. The identifying information may have been received from the consumer during enrollment.

If the consumer is unable to verify themselves when responding to the challenges presented by the IAS at block 625 then the transaction ends at block 630. Otherwise, the consumer may then verify the transaction information they are asked to verify at block 635. If they disagree the transaction ends at block 630. At this point, the consumer may reinitiate a transaction and correct the deficiencies in the transaction information. If the transaction information is correct, the plug-in retrieves the private key and digitally signs the transaction at block 640. The digital signature may then be sent to the merchant for continued processing and/or payment at block 645.

Consumers may enroll a transaction card or themselves through their card issuer or through a third party financial institution. Transaction cards may be pre-enrolled when issued to a consumer. A consumer may be present with the option to enroll with hosted or local authentication solutions. In other embodiments, the issuer may dictate whether the transaction card is enrolled for local or hosted authentication. The consumer may be required to present identifying or authenticating information in order to enroll a transaction card. During enrollment the consumer may also be required to establish security procedures that may be used by the consumer create the digital signature using the private key. If the consumer is enrolled for local authentication, the consumer may be provided with a smartcard, a smartcard reader, a biometric reader, software to run authenticating devices, etc.

The embodiments of the invention may be implemented for flexibility in their application. For example, a consumers may be enrolled for local and/or hosted authentication. For hosted authentication the consumer may be subjected to any number of authenticating questions or challenges. Each the IAS may host a webpage with their desired level of security. For example, one the IAS may only require a username and password. Another the IAS may present a webpage requiring the PAN and a PIN. Yet another the IAS may require the consumer to access the webpage from a specific computer, or from a specific IP address. Moreover, the local authentication schemes may apply various authentication schemes. For example, one consumer may employ a smartcard reader that may be used to authenticate themselves. In another embodiment, the local authentication scheme may only require a username and password. Yet another embodiment may use the consumer's PIN to authenticate the transaction.

In many of the embodiments of the invention described above, the consumer holds the private key and a financial institution, network or the IAS holds the public key. In another embodiment of the invention, the consumer may digitally sign a transaction with a public key that may be decrypted using a private key held by the financial institution, IAS or network.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels and/or various other mediums capable of storing, containing or carrying instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for authenticating an electronic transaction between a consumer and a merchant without using a passcode or personal identification number (PIN), wherein the method occurs at the merchant and comprises:

receiving account information associated with a debit card account at a merchant computer system from the consumer over the Internet, wherein the consumer accesses the Internet using a consumer's computer, and the account information does not include a passcode or a personal identification number (PIN) for the debit card account;

confirming, at the merchant computer system, enrollment of the debit card account for digital signature authentication from a financial institution;

receiving, at the merchant computer system, consumer specific authentication parameters from the financial institution, wherein the consumer specific authentication parameters comprises an authentication scheme comprising a hosted or a local digital signature service;

sending transaction information from the merchant computer system over the Internet to the consumer's computer for a digital signature;

sending the authentication scheme over the Internet from the merchant computer system to the consumer's computer;

receiving, at the merchant computer system, a digital signature from the consumer's computer over the Internet, wherein the digital signature does not include a passcode or personal identification number (PIN) for the debit card account, and the digital signature comprises encrypted portions of the transaction information;

sending, from the merchant computer system, the transaction information and the digital signature comprising encrypted portions of the transaction information to the financial institution;

receiving, at the merchant computer system, payment authorization from the financial institution; and sending, from the merchant computer system, a receipt URL to the financial institution, the receipt URL later sent to the consumer by the financial institution.

2. The method according to claim 1, wherein the financial institution is either an issuer authentication server (IAS) or a cardholder account directory service (CADS).

3. The method according to claim 1, wherein the confirming enrollment of the consumer's account for digital signature authentication further comprises:
  requesting enrollment confirmation from the financial institution; and
  receiving enrollment confirmation from the financial institution.

4. The method according to claim 1, wherein the authentication scheme is a URL that points to a plug-in residing on the consumer's computer.

5. The method according to claim 1, wherein the authentication scheme is a URL pointing to a webpage hosted by an issuer authentication server (IAS).

6. The method according to claim 1, wherein the digital signature comprises encrypting transaction information with a private key associated with the authentication scheme.

7. The method according to claim 6, wherein encrypting transaction information comprises encrypting the transaction information using an encryption scheme selected from the group consisting of RSA encryption, the digital signature algorithm, Schnorr signature, Pointcheval-Stern signature algorithm, the Rabin signature algorithm, any of the SHA algorithms, the undeniable signature algorithm, ECDSA, DSA, the ECC algorithm, elliptical curve techniques, Paillier cryptosystem, the ElGamal algorithm, and the Diffie-Hellman key exchange.

8. The method according to claim 1, wherein the transaction information comprises information selected from the group consisting of transaction currency code, transaction amount, transaction ID, transaction reference number, transaction time, transaction ship data, account number, consumer name, and merchant name.

9. The method according to claim 1, further comprising sending the digital signature, and the transaction information to a merchant processor.

10. The method according to claim 1, further comprising creating an ISO 8583 transaction using the digital signature and the transaction information; and sending the ISO 8583 message to a merchant processor.

11. The method of claim 4, wherein the URL sent to the consumer's computer as part of the authentication scheme is configured to automatically direct the consumer's web browser to the URL where the plug-in may be launched.

12. The method of claim 11, wherein the plug-in is configured to interface with a smartcard reader or biometric detector.

13. The method of claim 1, wherein the received account information includes a primary account number (PAN) of a debit card associated with the debit card account.

14. The method of claim 6, wherein the encrypting transaction information comprises encrypting the transaction information using an encryption scheme selected from the group consisting of RSA encryption, Schnorr signature, Pointcheval-Stern signature algorithm, the Rabin signature algorithm, any of the SHA algorithms, the undeniable signature algorithm, ECDSA, DSA, the ECC algorithm, elliptical curve techniques, Paillier cryptosystem, the ElGamal algorithm, and the Diffie-Hellman key exchange.

15. The method of claim 6, wherein the encrypting transaction information comprises encrypting the transaction information using the Pointcheval-Stern signature algorithm.

* * * * *